United States Patent [19]
Haley et al.

[11] Patent Number: 5,669,223
[45] Date of Patent: Sep. 23, 1997

[54] TRANSPORT TEMPERATURE CONTROL SYSTEM HAVING ENHANCED LOW AMBIENT HEAT CAPACITY

[75] Inventors: James H. Haley, Eden Prairie; Gillian M. Drake, Bloomington; Doyle G. Herrig, Elko, all of Minn.

[73] Assignee: Thermo King Corporation, Minneapolis, Minn.

[21] Appl. No.: 665,968

[22] Filed: Jun. 21, 1996

Related U.S. Application Data

[63] Continuation of Ser. No. 385,499, Feb. 8, 1995, abandoned.

[51] Int. Cl.⁶ ..................................................... F25B 13/00
[52] U.S. Cl. ..................... 62/160; 62/174; 62/205; 62/324.4
[58] Field of Search ......................... 62/115, 160, 174, 62/197, 205, 206, 224, 225, 324.4

[56] References Cited

U.S. PATENT DOCUMENTS

| | | |
|---|---|---|
| 3,370,438 | 2/1968 | Hopkinson . |
| 4,226,604 | 10/1980 | Weis ........................... 62/197 X |
| 4,258,553 | 3/1981 | Kelly . |
| 4,268,291 | 5/1981 | Cann . |
| 4,306,420 | 12/1981 | Cann . |
| 4,324,105 | 4/1982 | Cann . |
| 4,362,030 | 12/1982 | Voorhis . |
| 4,394,816 | 7/1983 | Voorhis . |
| 4,419,866 | 12/1983 | Howland . |
| 4,454,725 | 6/1984 | Cann . |
| 4,720,980 | 1/1988 | Howland . |
| 4,748,818 | 6/1988 | Satterness . |
| 4,903,495 | 2/1990 | Howland . |
| 4,912,933 | 4/1990 | Renken ........................ 62/278 X |
| 4,986,084 | 1/1991 | Beckhusen ................... 62/205 X |
| 5,056,324 | 10/1991 | Haley ........................ 62/324.4 X |
| 5,157,933 | 10/1992 | Brendel . |
| 5,168,713 | 12/1992 | Howland ........................ 62/117 |
| 5,172,559 | 12/1992 | Renken . |
| 5,193,353 | 3/1993 | Brendel . |
| 5,197,297 | 3/1993 | Brendel . |
| 5,415,006 | 5/1995 | Renken . |

FOREIGN PATENT DOCUMENTS

| | | |
|---|---|---|
| 0348333 | 12/1989 | European Pat. Off. . |
| 2042150 | 9/1980 | United Kingdom . |

*Primary Examiner*—Harry B. Tanner

[57] ABSTRACT

In a transport temperature control system having a cooling and heating mode of operation an apparatus and method are provided for enhancing the heating capacity during the heating mode of operation. A second expansion valve is provided to connect the higher pressure liquid line to the refrigerant circuit downstream of the evaporator. When additional refrigerant is needed in the heating circuit to increase heating capacity, especially during low ambient temperature operating conditions, the second expansion valve is caused to open to admit more refrigerant to the system. After passing through the second expansion valve low pressure gas is passed to the compressor, optimizing compressor efficiency such that an increased amount of hot refrigerant gas is delivered to the evaporator for enhanced heating capacity.

22 Claims, 2 Drawing Sheets

TRANSPORT TEMPERATURE CONTROL SYSTEM HAVING ENHANCED LOW AMBIENT HEAT CAPACITY

This application is a continuation of application Ser. No. 08/385,499 filed Feb. 8, 1995, abandoned.

TECHNICAL FIELD

The invention relates in general to transport temperature control systems, and more particularly to systems having heating and cooling cycles which enhance the capacity for heating a served space during low ambient temperature conditions.

BACKGROUND OF THE INVENTION

Transport temperature control systems operate in both a cooling and heating capacity to provide the necessary environment for a served space, such as a truck or trailer box section. The system switches between the cooling and heating modes of operation by means of a mode selector valve. In a first or cooling circuit, hot compressor discharge gas is fed in series to a condenser, a receiver, a heat exchanger, an expansion valve, evaporator, an accumulator and is returned to the compressor. In the second or heating circuit, the mode selector valve diverts the hot compressor discharge gas to an evaporator defrost pan heater, the evaporator, the heat exchanger, accumulator and returns to the compressor.

To ensure that an appropriate level of liquid refrigerant is available for the system during the heating cycle, prior art procedures provide a means for pressurizing the receiver with the hot compressor discharge gas to force liquid refrigerant from the receiver and into the refrigerant circuit. A bleed port is provided in the expansion valve to allow this liquid refrigerant to flow into the evaporator during the heating cycle to improve heating or defrost capacity. An example of such a system is U.S. Pat. No. 4,419,866. Improvements on this type of operation can also be found in U.S. Pat. Nos. 4,748,818, 4,912,933 and 5,056,324, all of which are assigned to the present assignee and hereby incorporated herein by reference. In some prior art arrangements, the accumulator may also be heated to change the liquid refrigerant to a gas to increase heating capacity.

In other prior art arrangements, the condenser is flooded in order to increase the pressure in the system such that additional refrigerant is added to the system during the heating cycle. This has several disadvantages. Some of these are that a larger charge of refrigerant is required to provide the increase in pressure, shutters are needed to restrict the air flow around the condenser during cold ambients to minimize the amount two-phase refrigerant present in the condenser, or condenser fan contacts and controls are needed to shut off the fan for minimal condenser air flow. Each of these schemes requires increased system complexity, and hence increased cost for the unit.

The desired result is high heat capacity at all ambient temperatures without returning liquid refrigerant to the compressor. An excess amount of liquid refrigerant leaving the accumulator can enter the compressor and cause failure of compressor components. Therefore, it is desirable that superheated vapor be returned to the compressor. However, the accumulator is a two phase device that must return a minimum amount of liquid to the compressor for lubrication oil return for compressor components. Thus the refrigerant mixture leaving the accumulator is most preferably above saturation temperature. A system and method are needed that will control the amount of refrigerant flow so that the maximum quantity of superheated gas and liquid oil are returned to the compressor at all ambient temperatures.

During low ambient temperature operating conditions, it is not uncommon for high pressure refrigerant to migrate to the low pressure receiver and condenser during the heating cycle. This reduces heating capacity. Current methods at low ambient temperatures only add refrigerant at the start of the heat cycle. If the refrigerant migrates back to the condenser, such as for example due to a leaking check valve, then the heating capacity will drop off and additional control methods are necessary to repeat the receiver and condenser flush/evacuation cycles to return the refrigerant to the heating circuit. Alternative prior art methods require a liquid bleed port expansion valve to permit high pressure liquid to flow into the system through the thermal expansion valve. What is needed then, is an alternative to these prior art schemes which will enhance heat capacity of the system during low ambient temperature conditions by preventing liquid refrigerant migration back to the low pressure side of the circuit at low ambients, which also returns superheated vapor to the compressor at high ambients.

DISCLOSURE OF THE INVENTION

The above objects are attained by the present invention, according to which, briefly stated, a transport temperature control system having cooling and heating cycles, a first refrigerant circuit which includes a compressor, condenser, receiver, first expansion valve, and evaporator, a second refrigerant circuit which includes the compressor and evaporator, and mode selector means having cooling and heating output ports selectively connectable to the first and second refrigerant circuits, respectively. The improvement comprises a second expansion valve having its inlet connected between the receiver and an inlet to the first expansion valve, an outlet connected between the evaporator and the compressor and sensing means for sensing a superheat condition of the refrigerant at a location between the evaporator and the compressor. The second expansion valve means operates to moderate the level of superheat of the refrigerant passed to the compressor to permit more efficient compressor operation. Preferably, the second sensing means is located a point upstream of the outlet of the second expansion valve, such that the opening of said second expansion valve means is controlled according to a predetermined level of the superheat condition.

BRIEF DESCRIPTION OF THE DRAWINGS

Various other objects, features, and advantages of the invention will become more apparent by reading the following detailed description in conjunction with the drawings, which are shown by way of example only, wherein.

DESCRIPTION OF THE PREFERRED EMBODIMENT

Figure 1:
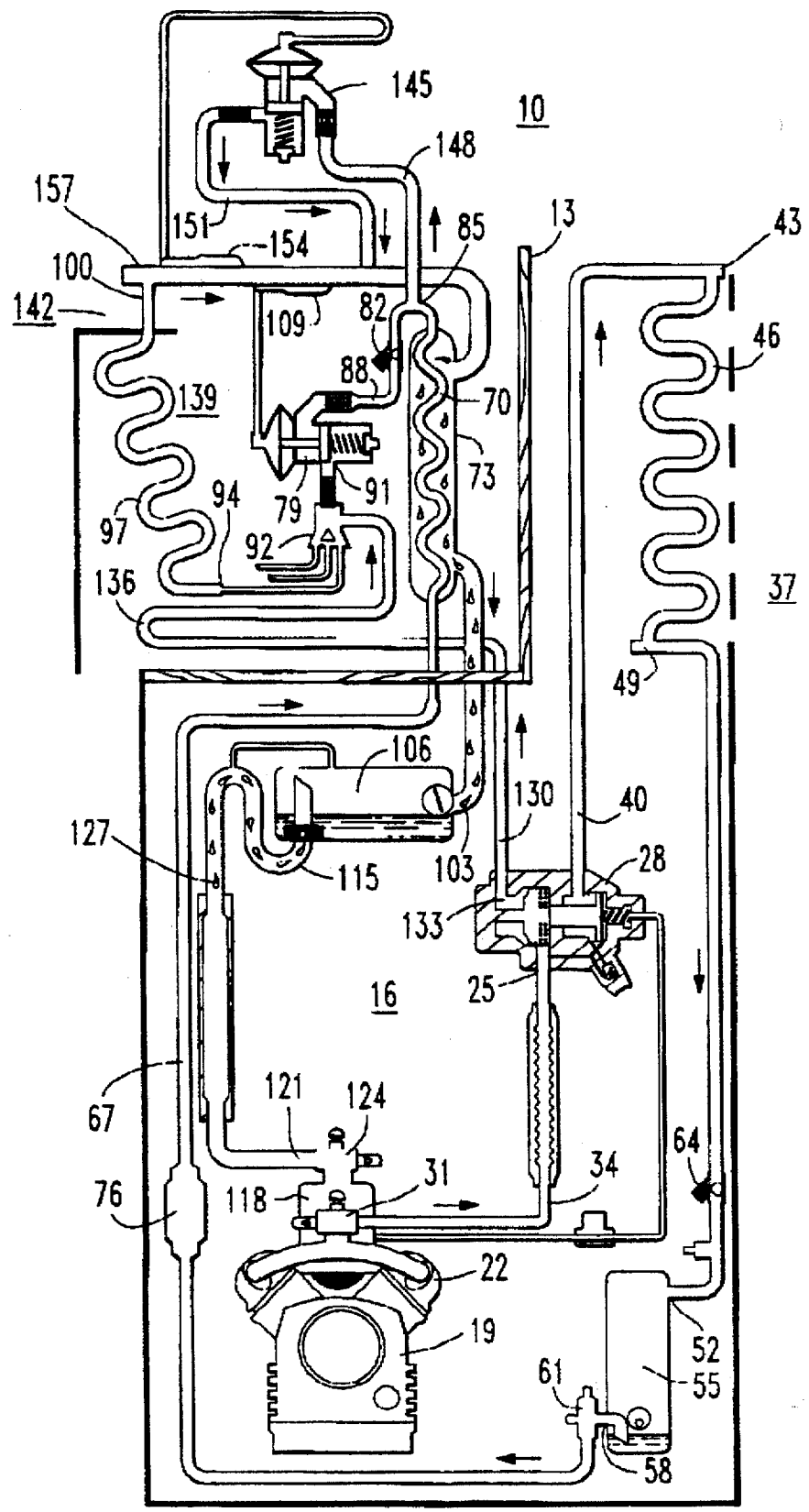
FIG. 1 is a schematic diagram of a preferred embodiment of a transport temperature control system according to the present.

Referring now to FIG. 1, there is shown a transport refrigeration system 10 according to the present invention. The refrigeration system is mounted, for example, on the front wall 13 of a truck or trailer. The refrigeration system includes a closed refrigeration circuit 16 which includes a refrigerant compressor 19 driven by a prime mover, such as an internal combustion engine (not shown). Discharge ports 22 of the compressor 19 are connected to an inlet port 25 of a three-way valve 28 via a discharge service valve 31 and hot gas conduit or line 34. The functions of the three-way valve 28, which has a heating and a cooling position, may be provided by separate valves, if desired.

In a first refrigeration circuit 37, the three-way valve 28 is placed in the cooling position (not shown), and one of the outlet ports 40 connected to an inlet side 43 of a condenser coil 46. An outlet side 49 of the condenser is connected to an inlet side 52 of a receiver tank 55, which includes an outlet side 58 which may also include a service valve 61. If desired, a one-way check valve 64 may be placed in the refrigerant line just prior to the receiver tank 55. From the receiver tank, high pressure liquid refrigerant passes along a conduit 67 and through a coil 70 in a heat exchanger 73, via a drier 76, to a first expansion valve 79. If desired, a second one-way check valve 82 is placed in the refrigerant line between an outlet 85 of the heat exchanger coil 70 and the inlet 88 of the first expansion valve 79. The outlet 91 of the expansion valve is connected to a distributor 92 which distributes low pressure liquid refrigerant to inlets on the inlet side 94 of an evaporator coil 97. The outlet side 100 of the evaporator coil is connected to the inlet side 103 of a closed accumulator tank 106 via passage through the heat exchanger 73. The first expansion valve 79 is controlled by an expansion valve thermal bulb 109 and evaporator outlet pressure. Low pressure gaseous refrigerant in the accumulator tank 106 is directed from the outlet side 115 thereof to the suction port 118 of the compressor 19 via suction line 121, suction service valve 124, and an optional suction throttling valve (not shown). A portion of a liquid mixture 127 (generally lubrication oil) is passed from the accumulator 106 to the compressor 19, for purposes of lubrication of compressor components, which function will be described more fully in discussion of the heating mode of the present invention.

In the heating position (as shown in the Figures) of three-way valve 28, a hot gas line 130 extends from the second outlet port 133 of three-way valve to the inlet side 94 of the evaporator coil 77 via an optional defrost pan heater 136 located below the evaporator coil. The heating position of three-way valve diverts the hot, high pressure refrigerant gas from the compressor 19 of the first refrigerant circuit 37, into a second, or heating mode, refrigerant circuit 139. The second refrigerant circuit includes the hot gas conduit or line 130, defrost pan heater 136, the distributor 84, and the evaporator coil 97. The first expansion valve 79 is bypassed during the heating mode. The one-way check valve 82 prevents any migration of refrigerant from the first expansion valve 79 back to the receiver tank 55 during low ambients. If the heating mode is initiated by a defrost cycle, by an appropriate control method, an evaporator fan (not shown) is not operated, or if the fan remains operative, an air damper (not shown) is closed to prevent warm air from being delivered to the served space 142. During a heating cycle required to hold a thermostat set point temperature, the evaporator fan is operated and the air damper remains open. After the evaporator 97, the liquid mixture, low pressure refrigerant gas and oil, passes to the heat exchanger 73, accumulator 106 and back to the compressor 19, as in the cooling mode.

The need for the check valve 64 in the line prior to the receiver tank to prevent the flow of refrigerant from the receiver to the condenser 46 in cold ambient temperature operating conditions, while required in previous refrigerant systems, is not required in the present invention for reasons which will now be more fully described. A second expansion valve 145 is operably connected to the system 16 to meter the refrigerant flow under low ambient operating conditions so that refrigerant gas is returned to the compressor 19 at all ambient temperatures, while permitting refrigerant flow from the receiver 55 and condenser 46 during low ambients, thus providing for the required heating capacity at all ambient conditions. It is an object of the present invention to return a minimally superheated refrigerant gas to the compressor at all ambient temperature operating conditions, most preferably the refrigerant gas having a minimal superheat above a level of about 20° F. At high ambient operating conditions, flow through the second expansion valve is restricted or closed off, while at low ambients, more refrigerant flows through the valve into the system.

As shown in FIG. 1, an inlet line 148 of the second expansion valve 145 is connected to the second 139 circuit at a point between the drier 76 and the first expansion valve inlet 88, and preferably at a location between the heat exchanger outlet 85 and the first expansion valve inlet. The inlet 148 of the second expansion valve 145 can be connected to the liquid refrigerant line 67 at any point upstream of the first expansion valve 79. The outlet 151 of the second expansion valve is connected to the second refrigerant circuit at a location between the evaporator outlet 100 and the compressor, preferably at the accumulator inlet 103, and most preferably at a point just prior to the heat exchanger 73, as shown in FIG. 1. The sensor bulb 154 of the second expansion valve is preferably located downstream of the evaporator 97 and anywhere prior to the compressor 19.

In a preferred embodiment of the invention, the second expansion valve sensor bulb is located at a point upstream of the second expansion valve outlet. If the superheat of the refrigerant leaving the evaporator is above acceptable limits, the second expansion valve 145 will open to allow refrigerant to pass from the conduit 67, since the receiver has a higher pressure than that at the evaporator outlet 100 (or the compressor inlet). Preferably, the degree of opening of the second expansion valve is controlled such that it is fully open when the superheat condition is above about 40° F., and fully closed when the superheat condition is below about 20° F. Upon passing through the second expansion valve 145, refrigerant flashes off and is now passed to the compressor 19, via the compressor suction line 121, for enhanced compressor efficiency and thus enhanced heating capacity. Since the sensor bulb 154 is located upstream of the second expansion valve outlet 151, the moderated temperature of the refrigerant from high pressure side line 67 is not sensed by the bulb. In this manner the actual superheat level of the refrigerant at the evaporator outlet 100 is the controlling parameter and adequate heating capacity is ensured, without providing too much liquid to the compressor suction line. By admitting liquid refrigerant from the high side to the system upstream of the compressor 19, such as at the inlet to the accumulator 106, heating capacity is optimized while also ensuring that a minimal level of liquid mixture 127 is passed to the compressor 19 for adequate component lubrication.

Figure 2:
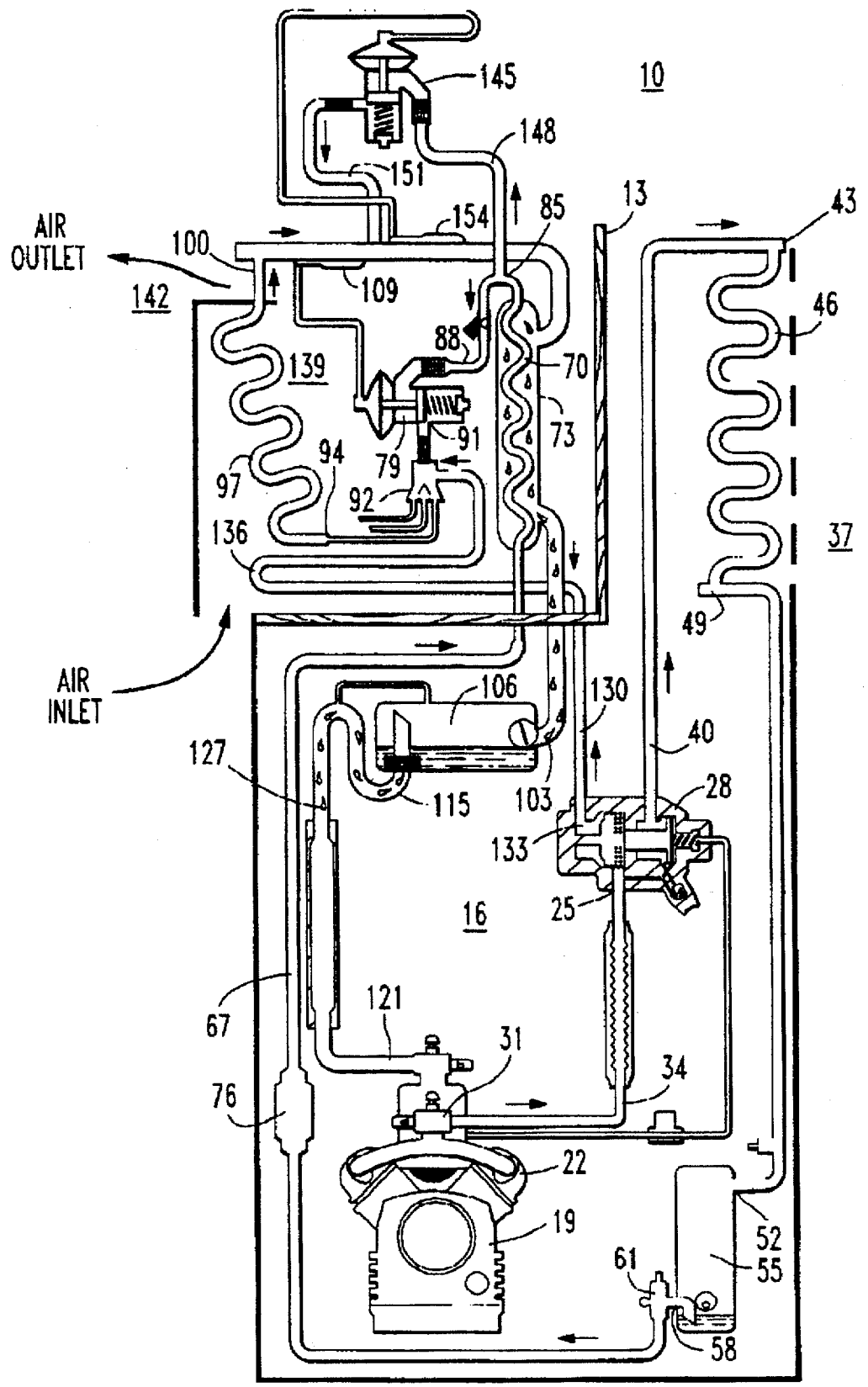
FIG. 2 is a schematic diagram of a second embodiment of a transport temperature control system according to the present.

In another embodiment of the invention, as shown in FIG. 2, the sensor bulb 154 of the second expansion valve is placed downstream of the outlet 151. In this manner the sensor 154 senses the superheat of the refrigerant leaving the evaporator 97 after it has been moderated by the additional refrigerant gas admitted from the high side conduit 67. This type of arrangement prevents too much refrigerant from being added to the system such that the superheat level of the refrigerant is above acceptable limits which may allow liquid refrigerant to be passed to the compressor 19, which would otherwise have the potential to cause failure of compressor components. This arrangement assures that the moderated superheat level of the refrigerant passing through the heat exchanger 73 is of sufficient superheat so that the correct level of gaseous refrigerant is passed to the compressor for enhanced heating.

An additional advantage of the present invention is that it may energize during the first or cooling cycle. If the evaporator outlet 100 has a superheat which is above normal cooling levels, then the second expansion valve 145 will feed additional refrigerant to the circuit. During moderate ambient, low box 142 (served space) temperature operating conditions, it is possible for the refrigerant to have too high of a superheat as it exits the evaporator 97. If the ambient temperature is moderate, the condenser pressure is not sufficient to force enough liquid across the thermal expansion valve 79. In this event, the second expansion valve 145 is energized, thereby creating another circuit for the refrigerant to enter the low side from the higher pressure side, when too high a superheat is sensed by the sensing bulb 154, to moderate the superheat entering the compressor 19.

While specific embodiments of the invention have been described in detail, it will be appreciated by those skilled in the art that various modifications and alterations would be developed in light of the overall teachings of the disclosure. Accordingly, the particular arrangements disclosed are meant to be illustrative only and not limiting as to the scope of the invention which is to be given the full breadth of the appended claims and in any and all equivalents thereof.

We claim:

1. In a transport temperature control system having cooling and heating cycles, a first refrigerant circuit which includes a compressor, condenser, receiver, first expansion valve means, and evaporator, a second refrigerant circuit which includes the compressor and evaporator, and mode selector means having cooling and heating output ports selectively connectable to the first and second refrigerant circuits, respectively, the improvement comprising second expansion valve means having its inlet connected between the receiver and an inlet to said first expansion valve means, an outlet connected between the evaporator and the compressor and sensing means for sensing a superheat condition of the refrigerant at a location between the evaporator and the compressor, such that the opening of said second expansion valve means is controlled according to a predetermined level of the superheat condition.

2. The transport temperature control system as recited in claim 1, wherein the predetermined level of the superheat condition is within the range of about 20° F.–40° F. superheat of the refrigerant.

3. The transport temperature control system as recited in claim 1, wherein said second expansion valve means is fully closed when the level of the superheat condition is below about 20° F.

4. The transport temperature control system as recited in claim 1, wherein said second expansion valve means is fully opened when the level of the superheat condition is above about 40° F.

5. The transport temperature control system as recited in claim 1, wherein said sensing means is located a point upstream of the outlet of the second expansion valve.

6. The transport temperature control system as recited in claim 3, further comprising a heat exchanger connected between the receiver and said first expansion valve means and an accumulator connected between said evaporator and compressor, the heat exchanger having a first inlet connected to the outlet of the receiver and a first outlet connected to the inlet of said first expansion valve means, a second inlet connected to the outlet of the evaporator and a second outlet connected to an inlet of the accumulator.

7. The transport temperature control system as recited in claim 6, wherein the inlet of said second expansion valve means is connected between the first outlet of the heat exchanger and the inlet of said first expansion valve means.

8. The transport temperature control means of claim 6, wherein the outlet of said second expansion valve means is connected between the outlet of the evaporator and the second inlet of the heat exchanger.

9. The transport temperature control system as recited in claim 8, wherein the sensor bulb of said second expansion valve means is positioned adjacent the outlet of the evaporator.

10. The transport temperature control system as recited in claim 1, wherein said sensing means is located a point downstream of the outlet of the second expansion valve.

11. The transport temperature control system as recited in claim 1, further comprising a heat exchanger connected between the receiver and said first expansion valve means and an accumulator connected between the evaporator and the compressor, the heat exchanger having a first inlet connected to the outlet of the receiver and a first outlet connected to the inlet of said first expansion valve means, a second inlet connected to the outlet of the evaporator and a second outlet connected to an inlet of the accumulator.

12. The transport temperature control system as recited in claim 11, wherein the inlet of said second expansion valve means is connected between the first outlet of the heat exchanger and the inlet of said first expansion valve means.

13. The transport temperature control means of claim 11, wherein the outlet of said second expansion valve means is connected between the outlet of the evaporator and the second inlet of the heat exchanger.

14. The transport temperature control system as recited in claim 13, wherein said sensing means of said second expansion valve means is positioned adjacent the outlet of the evaporator.

15. A method of operating a transport temperature control system having a heating cycle, the system comprising a first refrigerant circuit which includes a compressor, condenser, receiver, first expansion valve and evaporator, and a second refrigerant circuit which includes the compressor and evaporator, mode selector means having cooling and heating output ports selectively connectable to the first and second refrigerant circuits, respectively, and a second expansion valve having its inlet connected between the receiver and an inlet to the first expansion valve and an outlet connected between the evaporator and the compressor, said method comprising the step of:

i. sensing a superheat condition of the refrigerant at a location between the evaporator and the compressor; and ii. controlling the opening of the second expansion valve when said sensed superheat condition is outside a predetermined range.

16. The method as recited in claim 15, wherein the predetermined range of step ii. is between about 20° F.–40° F.

17. The method as recited in claim 16, wherein step ii. comprises fully opening the second expansion valve when the superheat condition is above about 40° F.

18. The method as recited in claim 16, wherein step ii. comprises fully closing the second expansion valve when the superheat condition is below about 20° F.

19. The method as recited in claim 17, wherein step i. comprises sensing the superheat condition of the refrigerant at a location between the evaporator and the compressor, but downstream of the outlet of the second expansion valve.

20. The method as recited in claim 18, wherein step i. comprises sensing the superheat condition of the refrigerant at a location between the evaporator and the compressor, but downstream of the outlet of the second expansion valve.

21. The method as recited in claim 17, wherein step i. comprises sensing the superheat condition of the refrigerant at a location between the evaporator and the compressor, but upstream of the outlet of the second expansion valve.

22. The method as recited in claim 18, wherein step i. comprises sensing the superheat condition of the refrigerant at a location between the evaporator and the compressor, but upstream of the outlet of the second expansion valve.

* * * * *